June 6, 1944.                    J. M. McGEE                    2,350,625
                PROCESS AND APPARATUS FOR SEPARATING MATERIAL
                    Filed Feb. 2, 1942          3 Sheets-Sheet 1

INVENTOR.
Jesse M. McGee
BY Richardson
        Attys.

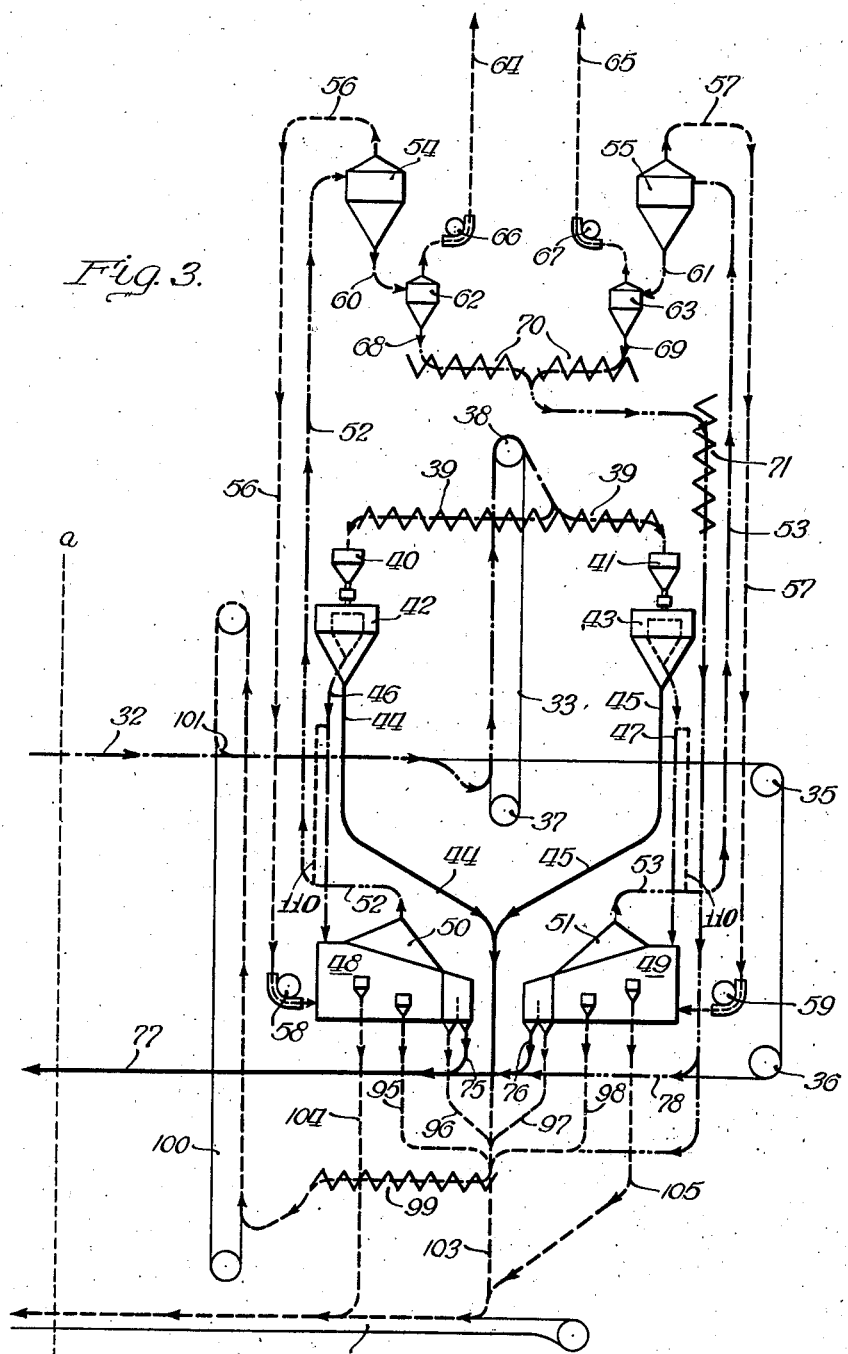

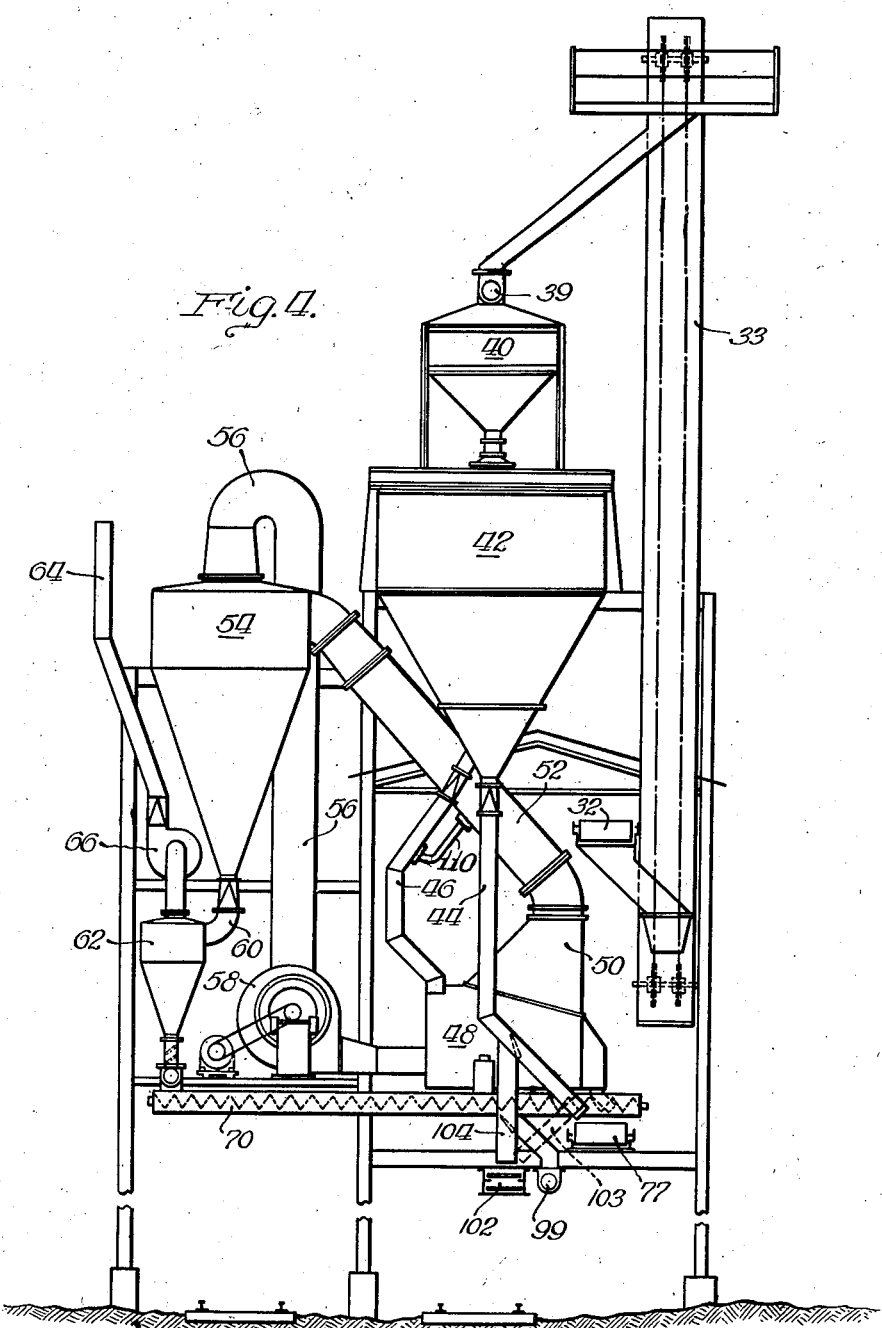

Patented June 6, 1944

2,350,625

UNITED STATES PATENT OFFICE 2,350,625

PROCESS AND APPARATUS FOR SEPARATING MATERIAL

Jesse M. McGee, Oak Park, Ill., assignor to Roberts and Schaefer Company, Chicago, Ill., a corporation of Illinois Application February 2, 1942, Serial No. 429,142

4 Claims. (Cl. 209—502)

This invention relates to the art of separating materials, and is particularly concerned with a new organization and coaction of apparatus for separating comminuted material in accordance with the specific gravities and the sizes of its particles. The new organization and combination of apparatus and the mode of operation thereof result in a novel process whereby the comminuted matter can be separated more economically and more efficiently than was heretofore possible.

The invention is particularly adapted to and will be described herein in connection with the dry-cleaning or separation of material such as raw coal, having a particle size varying from about ¼" to 0" in diameter, that is, material containing a relatively large amount of finely divided and dust-like particles.

The raw material is fed to a mechanical separator which removes dust-like matter therefrom and the remaining coarser material is supplied through an exteriorly closed conduit to a second air-controlled separator, e. g., of the type disclosed in the U. S. Patent No. 2,245,942, issued June 17, 1941, wherein the material is separated in accordance with the specific gravities of its particles. Exhaust air from the second separator is circulated in a closed system for reuse therein and dust-like matter is removed from the circulating air stream. A bleeder connection is provided between the supply conduit from the first separator and the exhaust from the second separator for the purpose of maintaining the circulating air stream substantially uniform. The temperature of the air stream circulating through the air-controlled separator is by this arrangement kept substantially constant.

Figure 1:
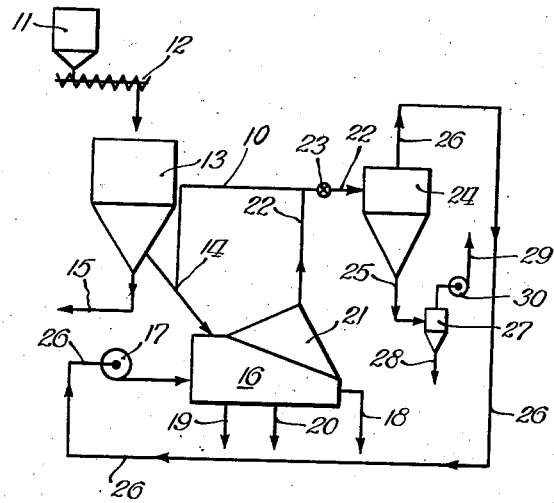
Figure 2:
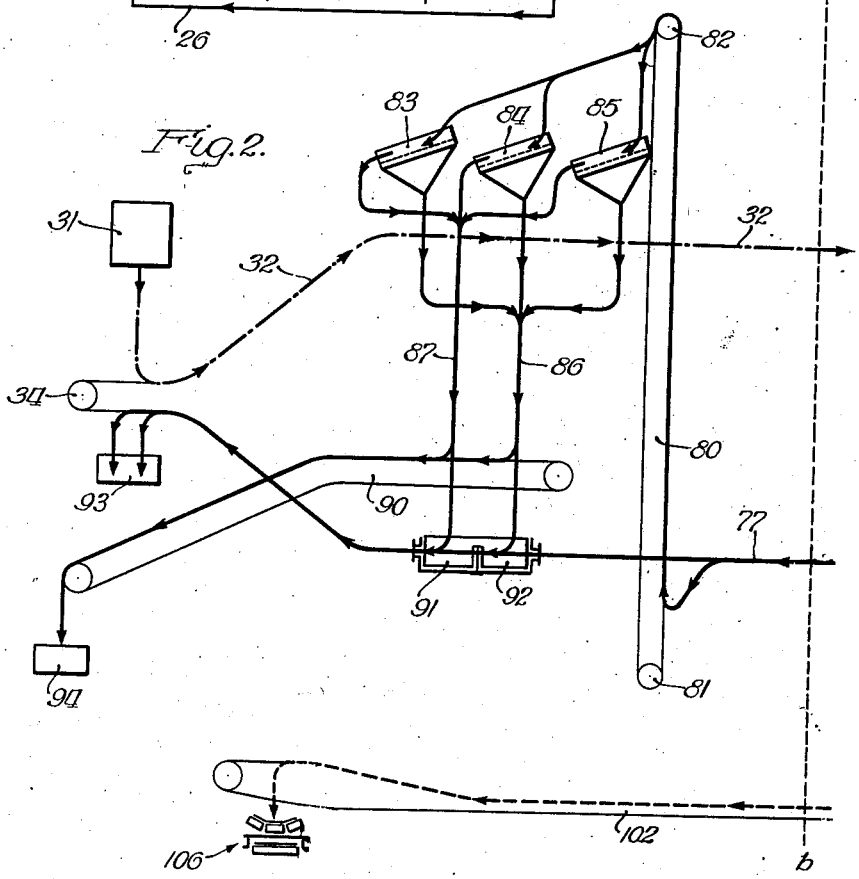

The above intimated objects and features will be brought out in the course of the detailed description which is rendered below with reference to the accompanying drawings. In these drawings, Fig. 1 shows a diagrammatic flow sheet representing an embodiment of the invention in a basic and simple organization of apparatus;

Figs. 2 and 3, when joined at the horizontal connecting lines, illustrate in a diagrammatic manner a substantially complete cleaning and separating plant embodying the invention; and Fig. 4 is an elevational view showing an embodiment of the structural arrangement and interconnection of the apparatus.

Like parts are numbered alike throughout the drawings used in the plant illustrated in Figs. 2 and 3. Details and elements which are well known will be described only to the extent necessary for understanding the invention.

It is assumed that it is desired to clean coal having a particle size varying approximately from ¼" to 0". Practical tests reveal that finely divided matter of a particle size smaller than about 48 mesh contained in the raw coal is responsible for certain difficulties which appear when it is attempted to clean such material.

The invention described below attempts a solution of the problem by attacking the causes of the difficulties. It removes from the raw feed the dust-like constituents of a size less than approximately 48 mesh and subjects the remainder of the feed to a separation treatment in an air cleaner employing a closed air circuit which connects the air cleaner with apparatus for collecting and concentrating the residual and the attrition dust. It is believed that this is the first instance showing a system and process which employs machinery of the type and in the combination and coaction as disclosed herein.

The basic organization illustrated in Fig. 1 comprises the feed bin 11 from which the raw feed of coal having particles of a diameter of ¼" to 0" is fed by suitable means, for example, a conveyor 12, to the mechanical separator 13. This separator may be of the general type disclosed in U. S. Patent No. 1,783,357, dated December 2, 1930. For the sake of completeness, this separator is briefly discussed below.

The mechanical separator comprises an outer shell which is cylindrical at the top and of inverted conical shape in its bottom portion. The outer shell contains an inner conical shell, a revolving distributor plate for receiving the raw material dropped into the separator and a fan for creating a circulating air current. The raw material within the separator is projected laterally by centrifugal force from the distributor plate across the path of rising air currents created by the fan, which picks up and carries away in suspension only the finer particles, whereas the heavier particles gravitate out of the air stream into the inner conical shell or interior cone.

The heavier particles emerge from the mechanical separator 13 shown in Fig. 1 laterally at an angle along the line 14. The fines, that is, in this specific embodiment particles of a size less than 48 mesh, emerge for disposal from the mechanical separator 13 centrally at the bottom, as indicated by the arrow 15. The heavier particles (¼" to 48 mesh) are fed to the air cleaner diagrammatically indicated at 16. This air cleaner may be of the type shown in the perviously mentioned Patent No. 2,245,942, dated June 17, 1941. A description of some of its salient features is included in the explanations which follow.

This air cleaner 16 is provided with a bottom air chamber and with a perforate trough-like inclined deck for receiving the raw feed for stratification. Air impulses are injected into the air chamber by means of a fan 17. The air impulses go through the perforate deck and through the layer of material thereon, which moves along the deck, keeping the material bed mobile and causing stratification of its constituent parts in accordance with the specific gravities thereof. The clean coal is discharged at the opposite end of the cleaner, as indicated by the arrow 18. The refuse, that is, particles of heaviest specific gravities, is discharged as indicated by the arrow 19. Middlings consisting of particles of intermediate specific gravities may be discharged as indicated by the arrow 20. The above noted patent may be consulted for further details concerning the structure and operation of the air cleaner.

The air cleaner is also provided with a dust hood 21 which conducts the dust-laden air through a conduit 22 provided with a suitable valve 23 to a primary collector 24. The valve 23 may be part of the intake conduit of the collector.

This collector may be of the type described in U. S. Patent No. 1,985,947, dated January 1, 1935. Its shape, as indicated in the drawings, is exteriorly somewhat similar to that of the mechanical separator 13. The internal mechanism, however, is different. The collector is provided in its upper part with a cylindrical interiorly downwardly depending extension forming in the upper cylindrical portion an annular channel. The dust-laden air from the conduit 22 is injected into the concentrator tangentially so as to create a rotating air stream which gyrates downwardly along the inner walls of the collector. The efficiency of the collector is a function of the inlet velocity and the fineness and character of the particles to be separated from the dust-laden air coming from the air cleaner 16, and it will be apparent that the inlet velocity can be effectively regulated by properly positioning the inlet valve 23. The entering dust-laden air stream is directed tangentially along the inner surface of the outer wall of the collector so that the maximum whirling or centrifugal effect will be imparted to the suspended material. The suspended material is deposited or concentrated adjacent the inner closed walls of the collector housing due to the centrifugal force imparted by the whirling air. The smaller lower end of the housing may be equipped with an extension having an upwardly projected conical bottom in the interior thereof, as described in detail in the previously mentioned patent, and is provided with an outlet leading substantially tangentially from one side of the housing to connect with the outlet conduit indicated in Fig. 1 at 25.

A relatively small proportion of the air stream introduced into the collector is withdrawn through the conduit 25, thus producing a sufficient down draft adjacent the inner walls of the housing to suck down the air carrying the greater concentration of the suspended material. The vortex of the rotating air currents within the collector 24 is broken at the bottom thereof by a centrally positioned conical member. Therefore there is in this collector a rotating marginally whirling and downwardly gyrating air current which deposits the suspended material and discharges it downwardly through the extension 25, together with a small amount of air.

The greater part of the air, which is substantially clean air, free of dust particles, escapes through a pipe in the upper part of the collector into the conduit 26 leading back to the fan 17 for injection into the air cleaner 16. There is thus a closed air circuit established between the air cleaner 16 and the dust residue-collecting apparatus comprising the collector 24. The small amount of air withdrawn through the discharge pipe 25 may be replaced in the closed air circuit by a bleeder connection between the conduit 14 and the conduit 22 indicated by the line marked by numeral 10. Whatever amount of air is withdrawn at 25 will therefore be automatically replaced at 22 from the conduit 14.

The collector 24 discharges through the conduit 25 into the concentrator 27. This concentrator may be of the same general structure as the collector 24 except that substantially no air is withdrawn at the outlet 28. The air from the concentrator 27 is vented to the outside by the fan 30 through a pipe 29, and the concentrated residual and attrition dust is removed through the outlet 28 by means of a suitable valve, a conveyor, or a gate.

Referring now to Figs. 2 and 3, which show a complete plant embodying the invention, numeral 31 indicates the supply of raw coal which is transported by means of a suitable conveyor along the dot-dash line 32 to an elevator 33. The conveyor 32 operates through the medium of the drive means 34, 35 and 36. The elevator 33 operates through the medium of the drive means 37 and 38. The raw coal, which may be composed of particles having a diameter, as previously stated, of approximately ¼" to 0", is elevated for discharge onto a raw coal conveyor diagrammatically illustrated in Fig. 3 at 39. This conveyor distributes the raw coal to the supply or surge bins 40 and 41, the first bin feeding the raw material to the mechanical separator 42 and the second bin feeding the raw coal to the mechanical separator 43. Each of these mechanical separators corresponds in structure and function to the separator 13 described in connection with Fig. 1. The separators 42 and 43 remove the fines of a particle size smaller than 48 mesh from the raw feed and discharge these fines at 44 and 45. The remaining material of coarser particle size (¼" x 48 mesh) is discharged from the separators at 46 and 47, and is fed to the air cleaners 48 and 49. Each of these air cleaners may be of the same general type and structure as the air cleaner 16 described in connection with the basic system shown in Fig. 1, each air cleaner being provided with a dust hood, as shown at 50 and 51. The dust-laden air (containing the residual and attrition dust separated out from the material in the air cleaners) is withdrawn from the dust hoods through the double-dash line conduits 52 and 53 leading to the collectors 54 and 55. Each of these collectors may be of substantially the same structure and may have the same operation as the collector 24 described in connection with the basic system shown in Fig. 1.

The clean air from the collectors 54 and 55 is discharged through the conduits 56 and 57 shown in dash lines, and is conducted back to the air cleaners 48 and 49 through the medium of the fans 58 and 59.

As in the case of the basic system shown in Fig. 1, we have here again a preliminary separation of the raw material through the medium of the mechanical separators 42 and 43, for removing particles smaller than 48 mesh from the raw feed and supplying the remainder to the air cleaners 48 and 49 for air-controlled gravity separation. And, as in the basic case, we also have a closed air circuit established between the air cleaners 48 and 49 and the residual and attrition dust collecting apparatus comprising the collectors 54 and 55.

The collectors 54 and 55 discharge the dust together with a small amount of air downwardly through conduits 60 and 61 into concentrators 62 and 63. These concentrators may be of the same general structure and operation as the concentrator 27 described in connection with the basic system in Fig. 1. Air which is substantially free of dust is vented from the concentrators to the outside at 64 and 65 through the medium of vent fans 66 and 67. The concentrators discharge the dust-like matter substantially without any air at 68 and 69 onto a dust conveyor 70 which feeds the dust to a conveyor 71. The system therefore provides for a positive and controlled concentration and collection of dust, facilitating its disposal. Only a relatively small amount of clean air, approximately 10 to 20% of the total circulating air volume, is vented to the outside.

Bleeder connections may again be established between the lines 46—52 and 47—53, respectively, so as to keep constant the amount of air flowing in the closed circuit between the air cleaners and the corresponding dust-collecting apparatus. The bleeder connections are indicated in Fig. 3 by numeral 110.

The air cleaners 48 and 49 discharge clean coal at 75 and 76 onto the conveyor branch 77. Part of the dust from the dust conveyor 71 may be added to the clean coal, as indicated at 78. The clean coal is moved by the conveyor branch 77 to a clean coal elevator 80, operating through the medium of the diagrammatically shown drive means 81 and 82, and is discharged onto suitable vibrating screens indicated at 83, 84 and 85 (Fig. 2). These screens divide the clean coal into suitable sizes. The under-size from all the screens may be, for example, $\frac{1}{16}$ x 48 mesh and may be discharged along the line 86. The over-size from these screens, for example, the particle sizes from $\frac{1}{4}$" to $\frac{1}{16}$", may be discharged along the line 87. The sized coal may then be conducted to the loading boom or conveyor 90, and may then be loaded into railroad cars indicated at 94. Part of the sized coal may be conducted to the compartments 91 and 92 and from there, if desired, to the conveyor 93 for suitable disposal or storage.

The middlings from the air cleaners 48 and 49 (Fig. 3) may be discharged at 95—96 and 97—98, respectively. Depending on the quality of these middlings, it may be decided to recirculate them, and in this case they are conducted to a refuse and middlings conveyor 99 which transports them to the middlings elevator 100, the latter elevating the material as shown and returning it at 101 for re-circulation and re-treatment together with the raw material supplied by way of conveyor 32. If the middlings do not warrant re-circulation, they may be discharged onto the refuse conveyor 102 along the discharge line 103, together with the refuse discharged from the air cleaners 48 and 49 along the lines 104 and 105. The fines (particles smaller than 48 mesh) discharged from the mechanical separators 42 and 43 through discharge conduits 44 and 45 may be wholly or partially added to the clean coal, or may be re-circulated together with the middlings, or discharged as refuse, all depending on their quality and content or absence of valuable material.

The conveyor 102 may discharge onto a suitable belt conveyor 106 which disposes of the refuse in such a manner as may be desired or necessary.

The structural representation of the equipment as shown in Fig. 4 identifies the various elements and details by the same reference numerals as applied to the diagrammatic representation of Figs. 2 and 3. Structural details belonging to the supporting structure or to the housing or sheds of the plant are indicated but are not marked in the drawings. Fig. 4 shows the equipment diagrammatically illustrated in the left half of Fig. 3, namely, the air cleaner 48, dust hood 50 and conduit 52 leading to the collector 54 with the discharge pipe 56 returning the clean air from the collector to the air cleaner 48 by way of a suitably driven fan 58. The collector 54 discharges dust-like material together with an amount of air through the conduit 60 into the concentrator 62 and the latter discharges the dust substantially without any air through suitable gate or valve provisions onto the dust conveyor 70. The latter may discharge either onto the clean coal conveyor 77 or onto the middlings conveyor 99. The refuse conveyor 102 receives the material to be discarded from the discharge spout of the air flow cleaner 48. The middlings may be discharged with or without the fines from the mechanical separator 42 through the connection 103. The air from the concentrator 62 is vented to the outside by means of the pipe 64 through the medium of the fan 66. Numeral 40 indicates the surge bin or supply bin for the mechanical separator 42 which receives its supply from the conveyor 39 over a chute leading downwardly from the elevator 33. The latter picks up the raw material for separation and cleaning from the conveyor 32, all as previously described. Suitable gate means may be used within or in place of the surge bin such as shown at 40.

The invention disclosed herein thus provides new features which may be briefly summed up as follows:

A. Fines within a definite size range that may cause difficulties in orthodox cleaning methods are substantially wholly removed prior to subjecting the raw material to the gravity separation process. This removal is not feasible with apparatus customarily employed in the art. The new organization of devices, including preliminary treatment of the raw material in the mechanical separator, as disclosed herein, makes such substantially complete and controlled preliminary removal of fines of a definite size range possible and does so in an efficient manner. The advantages resulting therefrom are:

1. The effective operating capacity of the gravity separator is increased because the material fed into it is not loaded with burdensome fines but is restricted to particle sizes which yield to stratification without hampering it;

2. The operation of the gravity separator is rendered more efficient and more economical because the relative absence of fines avoids a series of complications which would otherwise occur;

3. The speed of effective gravity separation is increased; and

4. The ash content of the clean coal is reduced.

B. The residual dust which may be contained in the raw feed supplied to the gravity separator from the mechanical separator, or may be produced by attrition incident to the gravity separation, is positively collected and efficiently concentrated by means of dust-collecting devices connected with the gravity separator in a manner which substantially eliminates the troublesome dust-collecting problem inherent in prior cleaning systems of this class.

C. The air-controlled gravity separator is supplied with air in a closed circuit drawing off air from the apparatus and returning it again for use, thereby producing the following advantages:

1. The temperature of circulating air current is kept substantially constant; it is approximated to the temperature of the material to be cleaned, facilitating the stratification process; and 2. The circulating air temperature may rise slightly above the temperature of the material, thus supporting the expulsion of residual and attrition dust from the material bed in the air cleaner.

D. The provisions for circulating the air through the gravity separator in a closed circuit are combined with the dust-collecting and dust-concentrating means, furnishing a completely unitary structure.

The above summary is furnished in order to emphasize the most prominent features of the invention. Other features appear from the previously rendered detailed description.

Changes may be made within the scope and spirit of the appended claims in which I have defined what I believe to be new and desire to have protected by Letters Patent of the United States.

I claim:

1. In combination, an air-controlled gravity separator of the class described, a tubular exteriorly closed conduit for supplying material together with an amount of air to said separator for treatment therein, a closed system for continuously circulating air under pressure through said separator and through the material therein, means in said system for continuously removing from said air simultaneously all dust-like matter extracted from the material treated in said separator and for separately collecting and discharging said collected dust-like matter together with a relatively small amount of air, and bleeder means between said tubular exteriorly closed supply conduit and said closed circulating system for continuously replacing in said system the amount of air discharged therefrom together with said collected dust-like matter, whereby the temperature of the air stream circulating through said separator is kept substantially constant independent of outside temperature conditions.

2. Apparatus for the dry cleaing of raw coal having a maximum particle size of about ¼" and containing an appreciable amount of dust-like matter comprising, in combination, a mechanical separator for receiving said raw coal for preliminary treatment whereby the bulk of particles smaller than about 48 mesh is eliminated therefrom, a separate air controlled gravity separator, means forming an exteriorly closed tubular supply conduit connecting said mechanical separator and said air controlled separator for conducting to the latter together with an amount of air only the coarser raw material having a particle size of about ¼" to 48 mesh discharged from said mechanical separator after elimination of the bulk of said smaller particles, a fan for supplying air currents to said gravity separator to effect separation therein of said coarser raw material in accordance with the specific gravities of the particles thereof, an exhaust conduit for withdrawing from said gravity separator air used in said gravity separation together with residual dust-like particles contained in the coarser raw material treated therein and produced therein by attrition incident to the separation treatment, a device for mechanically treating all said withdrawn dust-containing air to remove therefrom substantially all of the residual and attrition-produced dust-like particles contained therein, a tubular outlet through which the cleaned air is expelled from said device, means forming a tubular uninterrupted return conduit which is closed to the outside throughout for conducting all of said cleaned air from said outlet directly and solely to said fan for re-use in said gravity separator, a concentrator for receiving from said device together with a small amount of air the dust-like matter removed from the air withdrawn from said gravity separator and for precipitating said matter and venting said small amount of air free of dust to the outside, and means forming a bleeder conduit disposed between said exteriorly closed supply and said exhaust conduits for supplying excess air to said device so as to compensate for the amount of air vented to the outside by said concentrator whereby the temperature of the air returned to said fan for re-use in said gravity separator is kept substantially constant independent of outside temperature conditions.

3. In the art of separating materials, a first separator for receiving comminuted intermixed raw material to remove therefrom the bulk of dust-like particles contained therein, a second air-controlled separator for receiving the material freed of such dust-like particles to effect separation thereof in accordance with the specific gravities of its component parts, an exteriorly closed supply conduit for feeding the material from said first to said second separator together with an amount of air, a dust collector for receiving the exhaust air from said air-controlled separator to clean said air of dust-like particles contained therein, an exteriorly closed exhaust conduit for conducting said exhaust air from the air-controlled separator to said dust collector, exteriorly closed conduit means for conducting clean air from said dust collector to said air-controlled separator for re-use therein, and a bleeder conduit for bleeding air from said exteriorly closed supply conduit into said exteriorly closed exhaust conduit to compensate for air lost in said dust collector, whereby the amount of clean air conducted to said air-controlled separator by means of said exteriorly closed conduit is maintained substantially uniform and the temperature thereof is kept substantially constant regardless of outside temperature conditions.

4. The process of separating comminuted intermixed raw material comprising the steps of feeding such material together with an amount of air to an air-controlled separator, confining said feed to exclude therefrom ingress of outside air, exhausting spent air from said air-controlled separator, confining said exhaust to exclude therefrom ingress of outside air, cleaning said exhaust air of dust-like matter, venting to the outside part of said cleaned exhaust air, returning the remaining cleaned air to said air-controlled separator for re-use therein, confining said return of cleaned air to exclude therefrom ingress of outside air, and bleeding air from said confined feed into said confined exhaust to compensate for air vented to the outside, whereby the amount of cleaned air returned to said air-controlled separator is maintained substantially uniform and the temperature thereof is maintained substantially constant regardless of outside temperature conditions.

JESSE M. McGEE.